United States Patent
Shatalov et al.

(10) Patent No.: US 11,945,735 B2
(45) Date of Patent: Apr. 2, 2024

(54) ULTRAVIOLET IRRADIATION OF A FLOWING FLUID

(71) Applicant: Sensor Electronic Technology, Inc., Columbia, SC (US)

(72) Inventors: Maxim S. Shatalov, Columbia, SC (US); Alexander Dobrinsky, Vienna, VA (US)

(73) Assignee: Sensor Electronic Technology, Inc., Columbia, SC (US)

( * ) Notice: Subject to any disclaimer, the term of this patent is extended or adjusted under 35 U.S.C. 154(b) by 0 days.

(21) Appl. No.: 17/526,227

(22) Filed: Nov. 15, 2021

(65) Prior Publication Data
US 2022/0073377 A1 Mar. 10, 2022

Related U.S. Application Data

(63) Continuation of application No. 16/369,525, filed on Mar. 29, 2019, now Pat. No. 11,174,174.
(Continued)

(51) Int. Cl.
*C02F 1/32* (2023.01)

(52) U.S. Cl.
CPC ........ *C02F 1/325* (2013.01); *C02F 2201/005* (2013.01); *C02F 2201/3227* (2013.01);
(Continued)

(58) Field of Classification Search
CPC ............... C02F 1/325; C02F 2001/005; C02F 2001/3227; C02F 2001/3228; C02F 2001/326; C02F 2009/36; C02F 2009/40
See application file for complete search history.

(56) References Cited

U.S. PATENT DOCUMENTS 7,553,456 B2   6/2009  Gaska et al.
7,634,996 B2  12/2009  Gaska et al.
(Continued)

FOREIGN PATENT DOCUMENTS

GB  2534377 A    7/2016
KR  1754946 B1 * 7/2017 ............. A23L 3/003
(Continued)

OTHER PUBLICATIONS

Smith, D., U.S. Appl. No. 16/369,525, Notice of Allowance, dated Jul. 21, 2021, 9 pages.
(Continued)

*Primary Examiner* — David E Smith
(74) *Attorney, Agent, or Firm* — LaBatt, LLC

(57) ABSTRACT

A solution for irradiating a flowing fluid through a channel with ultraviolet radiation is provided. Ultraviolet radiation sources can be located within the channel in order to direct ultraviolet radiation towards the flowing fluid and/or the interior of the channel. A valve can be located adjacent to the channel to control the flow rate of the fluid. A control system can control and adjust the ultraviolet radiation based on the flow rate of the fluid and a user input component can receive a user input for the control system to adjust the ultraviolet radiation. The ultraviolet radiation sources, the control system, the user input component, and any other components that require electricity can receive power from a rechargeable power supply. An electrical generator located within the channel can convert energy from the fluid flowing through the channel into electricity for charging the rechargeable power supply.

20 Claims, 4 Drawing Sheets

Related U.S. Application Data

(60) Provisional application No. 62/651,157, filed on Mar. 31, 2018.

(52) U.S. Cl.
CPC .................. C02F 2201/3228 (2013.01); C02F 2201/326 (2013.01); C02F 2209/36 (2013.01); C02F 2209/40 (2013.01)

(56) References Cited

U.S. PATENT DOCUMENTS

| | | | |
|---|---|---|---|
| 8,277,734 B2 | 10/2012 | Kuodymov et al. | |
| 8,980,178 B2 | 3/2015 | Gaska et al. | |
| 9,006,680 B2 | 4/2015 | Bettles et al. | |
| 9,034,271 B2 | 5/2015 | Shur et al. | |
| 9,061,082 B2 | 6/2015 | Gaska et al. | |
| 9,138,499 B2 | 9/2015 | Bettles et al. | |
| 9,179,703 B2 | 11/2015 | Shur et al. | |
| 9,572,903 B2 | 2/2017 | Dobrinsky et al. | |
| 9,598,294 B2 | 3/2017 | Braunberger | |
| 9,603,960 B2 | 3/2017 | Dobrinsky et al. | |
| 9,687,577 B2 | 6/2017 | Dobrinsky et al. | |
| 9,707,307 B2 | 7/2017 | Shur et al. | |
| 9,718,706 B2 | 8/2017 | Smetona et al. | |
| 9,724,441 B2 | 8/2017 | Shur et al. | |
| 9,750,830 B2 | 9/2017 | Shur et al. | |
| 9,757,486 B2 | 9/2017 | Dobrinsky et al. | |
| 9,795,699 B2 | 10/2017 | Shur et al. | |
| 9,801,965 B2 | 10/2017 | Bettles et al. | |
| 9,802,840 B2 | 10/2017 | Shturm et al. | |
| 9,878,061 B2 | 1/2018 | Shur et al. | |
| 9,919,068 B2 | 3/2018 | Shur et al. | |
| 9,974,877 B2 | 5/2018 | Bettles et al. | |
| 9,981,051 B2 | 5/2018 | SHur et al. | |
| 9,987,383 B2 | 6/2018 | Bilenko et al. | |
| 9,999,782 B2 | 6/2018 | Shur et al. | |
| 10,004,821 B2 | 7/2018 | Dobrinsky et al. | |
| 10,040,699 B2 | 8/2018 | Smetona et al. | |
| 10,099,944 B2 | 10/2018 | Smetona et al. | |
| 10,166,307 B2 | 1/2019 | Dobrinsky et al. | |
| 10,383,964 B2 | 8/2019 | Shatalov et al. | |
| 10,426,852 B2 | 10/2019 | Dobrinsky et al. | |
| 10,433,493 B2 | 10/2019 | Barber, III et al. | |
| 10,441,670 B2 | 10/2019 | Shur et al. | |
| 10,442,704 B2 | 10/2019 | Bilenko et al. | |
| 10,517,974 B2 | 12/2019 | Dobrinsky et al. | |
| 10,543,290 B2 | 1/2020 | Shur et al. | |
| 10,548,332 B2 | 2/2020 | Dobrinsky et al. | |
| 10,624,978 B2 | 4/2020 | Dobrinsky et al. | |
| 10,646,603 B2 | 5/2020 | Shur et al. | |
| 10,687,598 B2 | 6/2020 | Lakios | |
| 10,688,210 B2 | 6/2020 | Shatalov et al. | |
| 10,688,211 B2 | 6/2020 | Barber, III | |
| 10,688,312 B2 | 6/2020 | Shur et al. | |
| 10,717,659 B2 | 7/2020 | Dobrinksy | |
| 10,751,663 B2 | 8/2020 | Shatalov | |
| 10,787,375 B2 | 9/2020 | Smetona et al. | |
| 10,869,943 B2 | 12/2020 | Dobrinsky et al. | |
| 10,881,755 B2 | 1/2021 | Dobrinsky et al. | |
| 10,994,040 B2 | 5/2021 | Kennedy et al. | |
| 11,124,750 B2 | 9/2021 | Estes et al. | |
| 11,166,415 B2 | 11/2021 | Barber, III et al. | |
| 11,173,221 B2 | 11/2021 | Dobrinsky | |
| 11,174,174 B2 * | 11/2021 | Shatalov | C02F 1/30 |
| 2006/0186026 A1 | 8/2006 | Saleh | |
| 2008/0136191 A1 * | 6/2008 | Baarman | F03B 3/04 |
| | | | 290/54 |
| 2010/0237254 A1 * | 9/2010 | Mason | C02F 1/325 |
| | | | 250/435 |
| 2012/0168641 A1 * | 7/2012 | Lizotte | C02F 1/325 |
| | | | 250/503.1 |
| 2013/0048545 A1 | 2/2013 | Shatalov et al. | |
| 2014/0166590 A1 * | 6/2014 | Rozenberg | C02F 1/325 |
| | | | 210/746 |
| 2014/0202962 A1 | 7/2014 | Bilenko et al. | |
| 2015/0008167 A1 * | 1/2015 | Shturm | G01N 21/33 |
| | | | 210/85 |
| 2016/0093412 A1 | 3/2016 | Liao et al. | |
| 2016/0114186 A1 * | 4/2016 | Dobrinsky | A61B 5/0071 |
| | | | 607/94 |
| 2017/0057842 A1 | 3/2017 | Dobrinsky et al. | |
| 2018/0104368 A1 | 4/2018 | Dobrinsky et al. | |
| 2019/0099613 A1 | 4/2019 | Estes et al. | |
| 2019/0231912 A1 | 8/2019 | Dobrinsky | |
| 2019/0263680 A1 | 8/2019 | Dobrinsky | |

FOREIGN PATENT DOCUMENTS

| | | |
|---|---|---|
| KR | 101754946 B1 | 7/2017 |
| RU | 2395460 C2 | 7/2010 |

OTHER PUBLICATIONS

Smith, D., U.S. Appl. No. 16/369,525, Office Action 2, dated Dec. 30, 2020, 17 pages.

Smith, D., U.S. Appl. No. 16/369,525, Final Office Action 1, dated Sep. 10, 2020, 16 pages.

Smith, D., U.S. Appl. No. 16/369,525, Office Action 1, Feb. 12, 2020, 15 pages.

* cited by examiner

ULTRAVIOLET IRRADIATION OF A FLOWING FLUID

REFERENCE TO RELATED APPLICATIONS

The current application is a continuation of U.S. patent application Ser. No. 16/369,525, filed on 29 Mar. 2019, which claims the benefit of U.S. Provisional Application No. 62/651,157, filed on 31 Mar. 2018, both of which are hereby incorporated by reference. Aspects of the invention are related to U.S. Pat. No. 9,802,840, issued on 31 Oct. 2017, which is hereby incorporated by reference.

TECHNICAL FIELD

The disclosure relates generally to ultraviolet radiation, and more particularly, to disinfecting a flowing fluid using ultraviolet radiation.

BACKGROUND ART

Sterilization systems for water, air, and surfaces are known in the art and have a successful history of development. The main feature of these sterilization systems is a source of ultraviolet (UV) radiation having wavelength(s) that are close to the absorption peaks of biologically significant molecules of DNA and proteins. The system can sterilize a medium to a safe condition as long as the power of the ultraviolet source and an exposure time are sufficient to destroy the internal biomolecular structure of the bacteria, viruses, protozoa and germs.

Known ultraviolet sterilization systems use mercury lamps or deep UV light emitting diodes as a source of ultraviolet radiation. Low-pressure and medium-pressure mercury lamps provide a linear spectrum of radiation with some lines, which wavelengths are in the relative vicinity to a DNA absorption line. A low-pressure mercury lamp with a main peak at 253.4 nanometers (nm) is often used in low-consumption residential water and air purification systems. Medium-pressure mercury lamps with a higher radiation power have a multi-peak radiation spectrum and are often used in municipal systems with medium and high water consumption.

However, the use of mercury lamps has significant drawbacks. For example, mercury lamps are fragile and bulky. Also, mercury is an extremely dangerous element, which implies serious limitations on applications of the mercury-based water purification systems. In particular, mercury lamps are not practical for use in transport and individual systems. Furthermore, a typical operating lifetime of a mercury lamp is less than 10,000 hours. An additional limitation is an inability to adjust or control a radiation spectrum of the mercury lamp. To this extent, the peaks of a mercury lamp do not exactly coincide with the absorption peaks of DNA and proteins, thereby decreasing the sterilization efficiency.

Some approaches have sought to minimize one or more drawbacks of mercury lamp-based sterilization. For example, one approach proposes a handheld ultraviolet water purification system based on a miniature mercury lamp. The design is targeted to overcome the size and portability drawbacks of traditional mercury lamp-based ultraviolet purifying systems. Nevertheless, the need for contact and even steering the sterilizing water with a fragile quartz sleeve with the mercury lamp inside makes the device dangerous for residential applications and not appropriate for transport, field, and portable application.

SUMMARY OF THE INVENTION

Aspects of the invention provide a solution that uses ultraviolet radiation to irradiate a flowing fluid (e.g., a liquid or gas) through a channel. An example of the fluid is water, but it is understood that the fluid can be any type of fluid that would need disinfection from harmful microorganisms, including bacteria, viruses, germs, parasitic agents, pathogens, and other contaminants. Ultraviolet radiation sources can be located within the channel in order to direct ultraviolet radiation towards the flowing fluid and/or the interior of the channel. A valve can be located adjacent to the channel to control the flow rate of the fluid. A control system can control and adjust the ultraviolet radiation generated by the ultraviolet radiation sources based on the flow rate and a user input component can receive a user input for the control system to adjust the ultraviolet radiation generated by the ultraviolet radiation sources. The ultraviolet radiation sources, the control system, the user input component, and any other components that require electricity can receive power from a rechargeable power supply. An electrical generator located within the channel can convert energy from the fluid flowing through the channel into electricity for charging the rechargeable power supply.

A first aspect of the invention provides a system, comprising: a channel for fluid to flow there through; a valve located adjacent to the channel for controlling a flow rate of the fluid flowing through the channel; a set of ultraviolet radiation sources located within the channel to irradiate at least one of: the flowing fluid or an interior of the channel with ultraviolet radiation, the set of ultraviolet radiation sources configured to operate in a UV-C wavelength range; a rechargeable power supply connected to the set of ultraviolet radiation sources; an electrical generator located within the channel, wherein the electrical generator converts an energy of the fluid flowing through the channel into electricity for charging the rechargeable power supply; a control system configured to control and adjust the ultraviolet radiation generated by the set of ultraviolet radiation sources based on the flow rate of the fluid flowing through the channel; and a user input component configured to receive a user input for the control system to adjust the ultraviolet radiation generated by the set of ultraviolet radiation sources.

A second aspect of the invention provides a water dispensing unit, comprising: a channel for water to flow there through, wherein an interior of the channel comprises an ultraviolet reflective material; a valve located adjacent to the channel for controlling a flow rate of the water flowing through the channel; a set of ultraviolet radiation sources located within the channel to irradiate at least one of: the flowing water or the interior of the channel with ultraviolet radiation, the set of ultraviolet radiation sources configured to operate in a UV-C wavelength range; a rechargeable power supply connected to the set of ultraviolet radiation sources; an electrical generator located within the channel, wherein the electrical generator converts an energy of the water flowing through the channel into electricity for charging the rechargeable power supply; a control system configured to control and adjust the ultraviolet radiation generated by the set of ultraviolet radiation sources based on the flow rate of the water flowing through the channel; and a user input component configured to receive a user input for the control system to adjust the ultraviolet radiation generated by the set of ultraviolet radiation sources.

A third aspect of the invention provides a liquid dispensing unit, comprising: a channel for liquid to flow there through, wherein an interior of the channel comprises an ultraviolet reflective material; a valve located adjacent to the channel for controlling a flow rate of the liquid flowing through the channel; a set of ultraviolet radiation sources located within the channel to irradiate at least one of: the flowing liquid or the interior of the channel with ultraviolet radiation, the set of ultraviolet radiation sources configured to operate in a UV-C wavelength range; a rechargeable power supply connected to the set of ultraviolet radiation sources; an electrical generator located within the channel, wherein the electrical generator converts an energy of the liquid flowing through the channel into electricity for charging the rechargeable power supply; a set of sensors configured to detect a set of current conditions, wherein the set of current conditions includes at least one of: the flow rate or a transparency, of the liquid; a control system configured to control and adjust the ultraviolet radiation generated by the set of ultraviolet radiation sources based on the set of current conditions; and a user input component configured to receive a user input for the control system to adjust the ultraviolet radiation generated by the set of ultraviolet radiation sources.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 1A shows a schematic of an illustrative dispensing unit including ultraviolet radiation sources for irradiating a flowing fluid according to an embodiment, while

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1A:
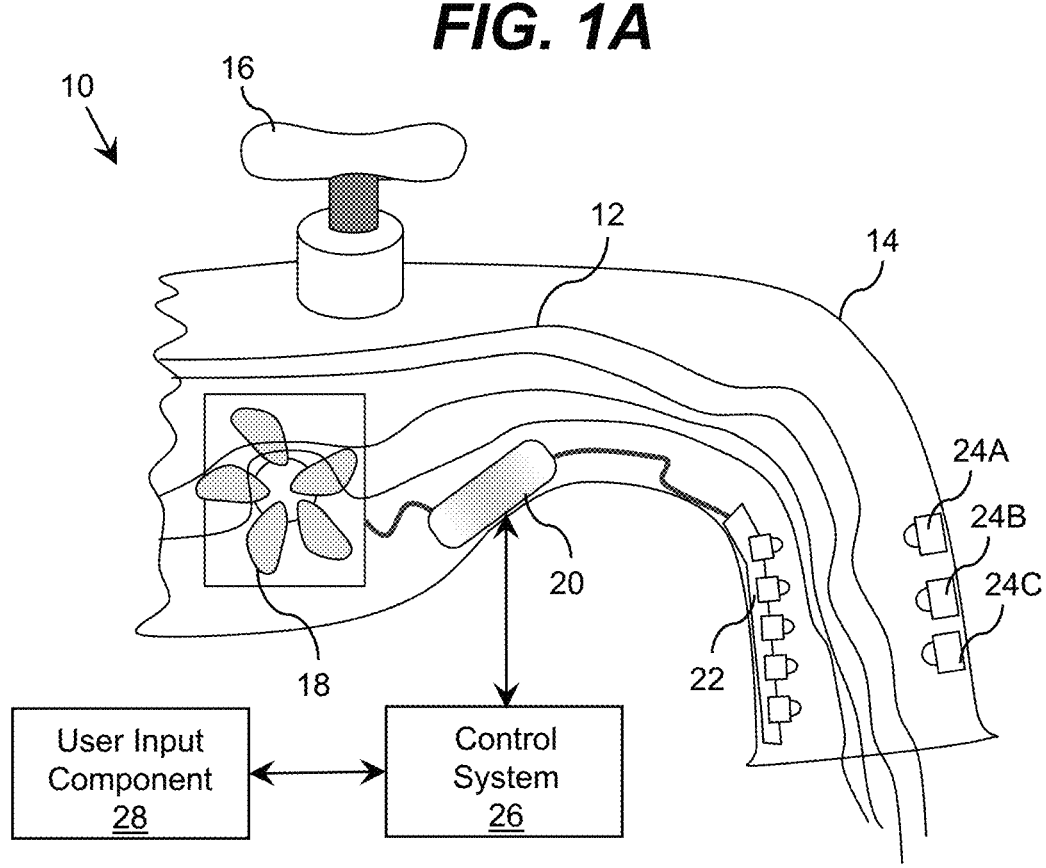

As indicated above, aspects of the invention provide a solution that uses ultraviolet radiation to irradiate a flowing fluid (e.g., a liquid or gas) through a channel. An example of the fluid is water or another potable liquid, but it is understood that the fluid can be any type of fluid that would need disinfection from harmful microorganisms, including bacteria, viruses, germs, parasitic agents, pathogens, and other contaminants. Ultraviolet radiation sources can be located within the channel in order to direct ultraviolet radiation towards the flowing fluid and/or the interior of the channel. A valve can be located adjacent to the channel to control the flow rate of the fluid. A control system can control and adjust the ultraviolet radiation generated by the ultraviolet radiation sources based on the flow rate and a user input component can receive a user input for the control system to adjust the ultraviolet radiation generated by the ultraviolet radiation sources. The ultraviolet radiation sources, the control system, the user input component, and any other components that require electricity can receive power from a rechargeable power supply. An electrical generator located within the channel can convert energy from the fluid flowing through the channel into electricity for charging the rechargeable power supply.

As used herein, ultraviolet irradiation of a fluid and/or the channel(s) containing the fluid can entail sanitizing, disinfecting, and/or sterilizing. Sanitizing generally means reducing the number of bacterial contaminants to a predetermined safe level. Disinfecting generally means destroying pathogenic and other types of microorganisms, while sterilizing can be more extensive in that it kills all microbial forms and/or include destroying the ability of the microbial forms to reproduce. While aspects of the invention are described in conjunction with such treatment of a fluid using ultraviolet radiation, it is understood that embodiments of the invention are not limited to ultraviolet radiation and can include other types of electromagnetic radiation, such as visible light and infrared radiation, and/or other applications.

Ultraviolet radiation, which can be used interchangeably with ultraviolet light, means electromagnetic radiation having a wavelength ranging from approximately 10 nm to approximately 400 nm. Within this range, there is ultraviolet-A (UV-A) electromagnetic radiation having a wavelength ranging from approximately 315 nm to approximately 400 nm, ultraviolet-B (UV-B) electromagnetic radiation having a wavelength ranging from approximately 280 nm to approximately 315 nm, and ultraviolet-C (UV-C) electromagnetic radiation having a wavelength ranging from approximately 100 nm to approximately 280 nm.

Generally, ultraviolet radiation, and in particular, UV-B radiation and UV-C radiation is "germicidal," i.e., it deactivates the DNA of bacteria, viruses and other pathogens, and thus, destroys their ability to multiply and cause disease. This effectively results in sterilization of the microorganisms. Specifically, UV-B radiation and UV-C radiation cause damage to the nucleic acid of microorganisms by forming covalent bonds between certain adjacent bases in the DNA. The formation of these bonds prevents the DNA from being "unzipped" for replication, and the organism is neither able to produce molecules essential for life process, nor is it able to reproduce. In fact, when an organism is unable to produce these essential molecules or is unable to replicate, it dies. Ultraviolet radiation with a wavelength of approximately between about 250 nm to about 290 nm provides the highest germicidal effectiveness, while ultraviolet radiation between about 260 nm to about 310 nm is sufficient for providing overall germicidal effectiveness, and ultraviolet radiation between 260 nm to 270 nm is a preferred range for facilitating disinfection, sterilization of potable liquids. While susceptibility to ultraviolet radiation varies, exposure to ultraviolet energy in the above range for about 20 to about 34 milliwatt-seconds/cm$^2$ is adequate to deactivate approximately 99 percent of the pathogens.

As used herein, a layer is a transparent layer when the layer allows at least ten percent of radiation having a target wavelength, which is radiated at a normal incidence to an interface of the layer, to pass there through. Furthermore, as used herein, a layer is a reflective layer when the layer reflects at least ten percent of radiation having a target wavelength, which is radiated at a normal incidence to an interface of the layer. In an embodiment, the target wavelength of the radiation corresponds to a wavelength of radiation emitted or sensed (e.g., peak wavelength+/−five nanometers) by an active region of an optoelectronic device during operation of the device. For a given layer, the wavelength can be measured in a material of consideration and can depend on a refractive index of the material.

As used herein, unless otherwise noted, the term "set" means one or more (i.e., at least one) and the phrase "any solution" means any now known or later developed solution. The singular forms "a," "an," and "the" include the plural forms as well, unless the context clearly indicates otherwise. Additionally, the terms "comprises," "includes," "has," and related forms of each, when used in this specification, specify the presence of stated features, but do not preclude the presence or addition of one or more other features and/or groups thereof.

Turning to the drawings, FIG. 1A shows a dispensing unit 10 for dispensing a fluid 12, such as a liquid (e.g., water). The dispensing unit includes a channel 14 for the fluid 12 to flow through and out of. The channel 15 can be any type of conduit that controls the fluid 12 flowing from a source (e.g., a storage tank, a well, and/or the like) combined with the pressure generated within the channel 14. It is understood that the interior of the channel 14 in any of the embodiments discussed herein can include at least some surfaces that are formed of an ultraviolet reflective material, such as aluminum, fluoropolymer, and/or the like. In an embodiment, at least some of the surfaces of the interior of the channel 14 can also comprise a photocatalytic material, such as titanium oxide ($TiO_2$).

A valve 16 is located adjacent to the channel 14 and controls a flow rate of the fluid 12. The valve 16 can include any type of valve that can control the fluid 12 (e.g., allow the fluid 12 to flow, stop the fluid 12 from flowing, adjust the flow rate, and/or the like). Although the valve 16 is shown as a knob on the channel 14, it is understood that the valve 16 can take any form.

In an embodiment, the dispensing unit 10 can include an electrical generator 18 located within the channel. The electrical generator 18 converts an energy of the fluid 12 flowing through the channel 14 into electricity for charging a rechargeable power supply 20. The rechargeable power supply component 20 can take the form of one or more batteries. In an embodiment, the dispensing unit 10 can include a vibration power generator that can generate power based on magnetically induced oscillations or stresses developed on a piezoelectric crystal, a wall plug for accessing electric power supplied from a grid, and/or the like. In an embodiment, the power supply component 20 can include a super capacitor that is rechargeable. Other power components that are suitable for use as the power supply component can include solar, a mechanical energy to electrical energy converter such as a piezoelectric crystal, a rechargeable device, a power station, etc.

A set of ultraviolet radiation sources 22 are located within an interior of the channel 14, within the pathway of the fluid 12, and connected to the rechargeable power supply component 20. It is understood that the set of ultraviolet radiation sources 22 can be hermetically insulated from the interior of the channel 14, e.g., using a transparent material. In an embodiment, the set of ultraviolet radiation sources 22 are secured by connecting components, such as screws, within the channel, so that the ultraviolet radiation sources 22 can be easily replaced. Although the set of ultraviolet radiation sources 22 are shown located on only one side of the channel 14, it is understood that the set ultraviolet radiation sources 22 can be located anywhere in one or more locations of the channel. As shown, the set of ultraviolet radiation sources 22 are connected to the rechargeable power supply component 20. As discussed herein, the set of ultraviolet radiation sources 22 can be powered by any mechanism, in addition to or instead of, the rechargeable power supply component 20, such as a household power outlet. In an embodiment, the rechargeable power supply component 20 can be recharged by a household power outlet. It is understood that the rechargeable power supply component 20 can be a wired or wireless power supply.

The set of radiation sources 22 can comprise any combination of one or more ultraviolet radiation emitters. Examples of an ultraviolet radiation emitter can include, but are not limited to, high intensity ultraviolet lamps (e.g., high intensity mercury lamps), discharge lamps, ultraviolet LEDs, super luminescent LEDs, laser diodes, and/or the like. In an embodiment, the set of ultraviolet radiation sources 22 can include a set of LEDs manufactured with one or more layers of materials selected from the group-III nitride material system (e.g., $Al_xIn_yGa_{1-x-y}N$, where $0 \leq x, y \leq 1$, and $x+y \leq 1$ and/or alloys thereof). Additionally, the set of ultraviolet radiation sources can comprise one or more additional components (e.g., a wave guiding structure, a component for relocating and/or redirecting ultraviolet radiation emitter(s), etc.) to direct and/or deliver the emitted radiation to a particular location/area, in a particular direction, in a particular pattern, and/or the like. Illustrative wave guiding structures can include, but are not limited to, a wave guide, a plurality of ultraviolet fibers, each of which terminates at an opening, a diffuser, and/or the like.

Figure 1B:
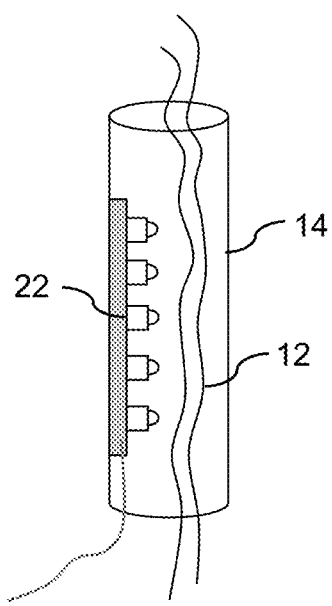
FIG. 1B shows a schematic of an illustrative channel with ultraviolet radiation sources according to an embodiment.

The set of radiation sources 22 can include ultraviolet radiation sources that operate in the ultraviolet wavelength range (e.g., 10 nm to 400 nm). In an embodiment, the set of radiation sources 22 can operate to emit radiation having a peak wavelength in or immediately adjacent to the UV-C wavelength range and are referred to as "UV-C sources" herein. For example, the set of radiation sources 22 can emit radiation having a peak wavelength in a range of approximately 250 nm to approximately 290 nm. In a more specific embodiment, the set of radiation sources 22 can operate in the wavelength range of approximately 270 nm to approximately 290 nm. Although FIGS. 1A and 1B shows five instances of the set of radiation sources 22 in the channel 14, it is understood that the dispensing unit 10 can include any number of instances of the set of radiation sources 22. Furthermore, each of the instances of the set of radiation sources 22 can include any number of sources.

In an embodiment, each of the ultraviolet radiation sources in the set of radiation sources 22 can operate at a different peak wavelength (A). In an embodiment, each of the ultraviolet radiation sources in the set of radiation sources 22 can irradiate a different direction within the channel 14 at different peak wavelengths. In another embodiment, the set of radiation sources 22 can all irradiate different directions within the channel 14 but with relatively uniform radiation. In another embodiment, more than one ultraviolet radiation source in the set of ultraviolet radiation sources 22 can irradiate a single direction within the channel 14 but each ultraviolet radiation source can operate at a different wavelength and/or intensity. In an embodiment, a portion of set of ultraviolet radiation sources 22 can operate in the UV-C range, while another portion of the set of ultraviolet radiation sources 22 can operate in the UV-A range.

The dispensing unit 10 can include a set of additional components 24A-C located within the channel. It is understood that the set of additional components 24A-C can be hermetically insulated from the interior of the channel 14 using any solution, such as a transparent material. In an embodiment, at least one of the set of additional components 24A-C can include one or more sensors. The sensors, which can include more than one of each type, can comprise, but are not limited to, a fluorescent sensor to detect the fluorescence emissivity generated from the fluid 12 after irradiation by one or more of the ultraviolet radiation sources 22, a transparency sensor to detect a transparency of the fluid 12, a presence sensor to detect the presence of fluid 12 within the channel 14, and/or the like. Other sensors can include a temperature sensor to detect the temperature of the fluid 12, an ultraviolet radiation sensor to detect the ultraviolet intensity within the channel 14, a visible sensor such as a visible camera that can obtain images of the interior of the channel 14, and/or the like. In an embodiment, the set of additional components 24A-C can also include a set of visible radiation sources.

The dispensing unit 10 includes a control system 26 operatively connected to other components of the dispensing unit 10, such as the set of ultraviolet radiation sources 22, the valve 16, the electrical generator 18, the rechargeable power supply component 20, the set of additional components 24A-C, and/or the like. The control system 26 can be configured to control and adjust the ultraviolet radiation generated by the set of ultraviolet radiation sources 22. In an embodiment, the control system 26 can adjust the ultraviolet radiation and/or the flow rate of the fluid 12 to achieve a target disinfection of the fluid 12 and/or the interior of the channel 14. In an embodiment, the set of ultraviolet radiation sources 22 can be periodically turned on by the control system 26 to ensure that the interior of the channel 14 is disinfected prior to the fluid 12 flowing through the channel 14. Although not shown, the channel 14 can include an air compression module for allowing air to blow through the channel to remove any fluid from the channel 14. Regardless, in an embodiment, the control system 26 can control and adjust the ultraviolet radiation and/or the flow rate of the fluid 12 based on a set of current conditions such as the flow rate of the fluid 12, a transparency of the fluid 12, a presence (or lack of) fluid 12 within the channel 14, the temperature of the fluid 12, images of the fluid 12 and/or interior of the channel 14, a fluorescence emissivity generated from the fluid 12, and/or the like.

The dispensing unit 10 also can include a user input component 28 operatively connected to the control system 26. The user input component 28 can receive a user input to control and/or adjust the ultraviolet radiation and/or the flow rate of the fluid 12. This can include turning on/off the fluid flow, increasing/decreasing the fluid flow, turning on/off the ultraviolet radiation, and/or adjusting the ultraviolet radiation. In an embodiment, the user input component 28 can include a set of buttons located on the dispensing unit 10 for entering the user input. In another embodiment, the user input component 28 can be a remote control module, located on a remote device, such as a smartphone, and be wirelessly connected to the control system 26. In an embodiment, the user input component 28 can also include an interface that displays information to the user, such as the set of current conditions, as discussed herein, that disinfection is currently occurring, the amount of charge within the rechargeable power supply component 20, and/or the like.

Figure 2:
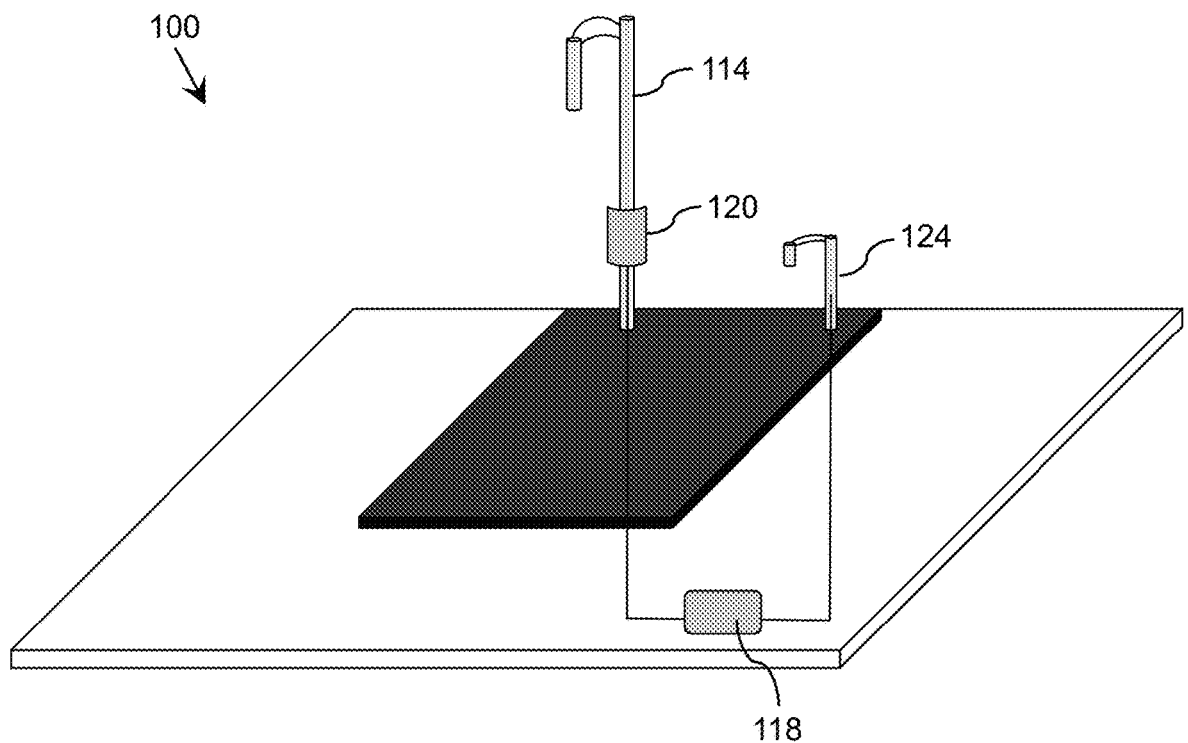
FIG. 2 shows a schematic of an illustrative dispensing unit including two channels according to an embodiment.

In an embodiment, the dispensing unit 10 can include a filter prior to irradiating the fluid 12 with ultraviolet radiation, such as the filter discussed in U.S. Pat. No. 9,802,840, issued on 31 Oct. 2017, which is hereby incorporated by reference. The control system 26 can adjust the valve 16 to direct fluid through a filter if the fluid is to be irradiated with ultraviolet radiation through the channel 14. In an embodiment, the fluid can flow through a second channel if it does not need to be filtered and irradiated with ultraviolet radiation. For example, turning now to FIG. 2, an illustrative water dispensing unit 100 according to an embodiment is shown. The dispensing unit 100 includes a first channel 114 and a second channel 124 for fluid to flow through. It is understood that the first channel 114 can include all the features of the channel 14 discussed in the dispensing unit 10 of FIG. 1A. If the fluid does not need to be filtered and irradiated with ultraviolet radiation, the fluid can flow through the second channel 124. In an embodiment, both channels 114, 124 include the electrical generator 118, as discussed in the dispensing unit of FIG. 1A, for generating electricity for a rechargeable power supply component 120 for the first channel 114.

Figure 3:
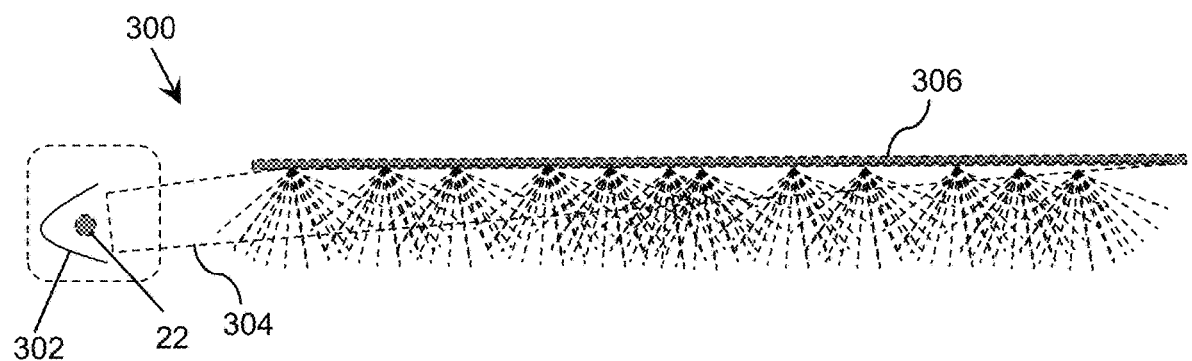
FIG. 3 shows an illustrative light guiding element for an ultraviolet radiation source according to an embodiment.

It is understood that one or more of the ultraviolet radiation sources in any of the embodiments discussed herein can include an additional component to guide and uniformly distribute the ultraviolet radiation. For example, one or more of the ultraviolet radiation sources can include a set of light guiding elements located adjacent to the ultraviolet radiation source. Turning now to FIG. 3, an illustrative light guiding element 300 according to an embodiment is shown. The light guiding element 300 can include a parabolic reflector 302 located adjacent to the ultraviolet radiation source 22. The parabolic reflector 302 reflects the ultraviolet radiation 304 towards a light guiding layer 306 that can diffusively reflect the ultraviolet radiation towards the fluid 12 and/or interior of the channel 14 (FIG. 1A). The parabolic reflector 302 can be formed of an ultraviolet reflective material, such as aluminum, a fluoropolymer, and/or the like. The light guiding layer 306 can be formed a material, such as silicon dioxide ($SiO_2$), aluminum oxide ($Al_2O_3$), fluoropolymer, calcium fluoride ($CaF_2$), magnesium fluoride ($MgF_2$), and/or the like.

Figure 4:
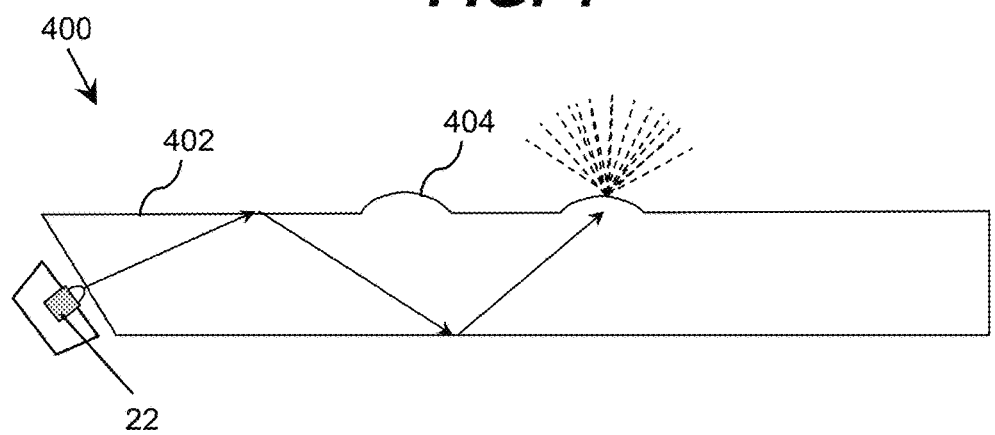
FIG. 4 shows an illustrative light guiding element for an ultraviolet radiation source according to an embodiment.

Turning now to FIG. 4, an illustrative light guiding element 400 according to an embodiment is shown. The light guiding element 400 comprises a layer 402 with a plurality of regions 404 that protrude from the surface of the layer 402. The plurality of regions 404 can be formed of an ultraviolet transparent and diffusive material, such as a fluoropolymer, so that the ultraviolet radiation is diffusively emitted from the layer 402. The remaining portions of the layer 402 can be formed of a reflective material, such as $SiO_2$, such that the ultraviolet radiation is reflected within the layer 402 before being diffusively emitted through the plurality of regions 404 towards the fluid 12 and/or interior of the channel 14 (FIG. 1A). In another embodiment, the layer 402 can include a diffusive film (not shown) for diffusively emitting the ultraviolet radiation.

In any of the embodiments discussed herein, the channel can include a set of mixing elements, such as meshes, blades, surfaces placed within the fluid pathway of the channel to modify the flow velocity and vorticity of the fluid. In an embodiment, the set of mixing elements can also include reflective/diffusive properties in order to uniformly distribute the ultraviolet radiation throughout the fluid and/or the interior of the channel.

Figure 5:
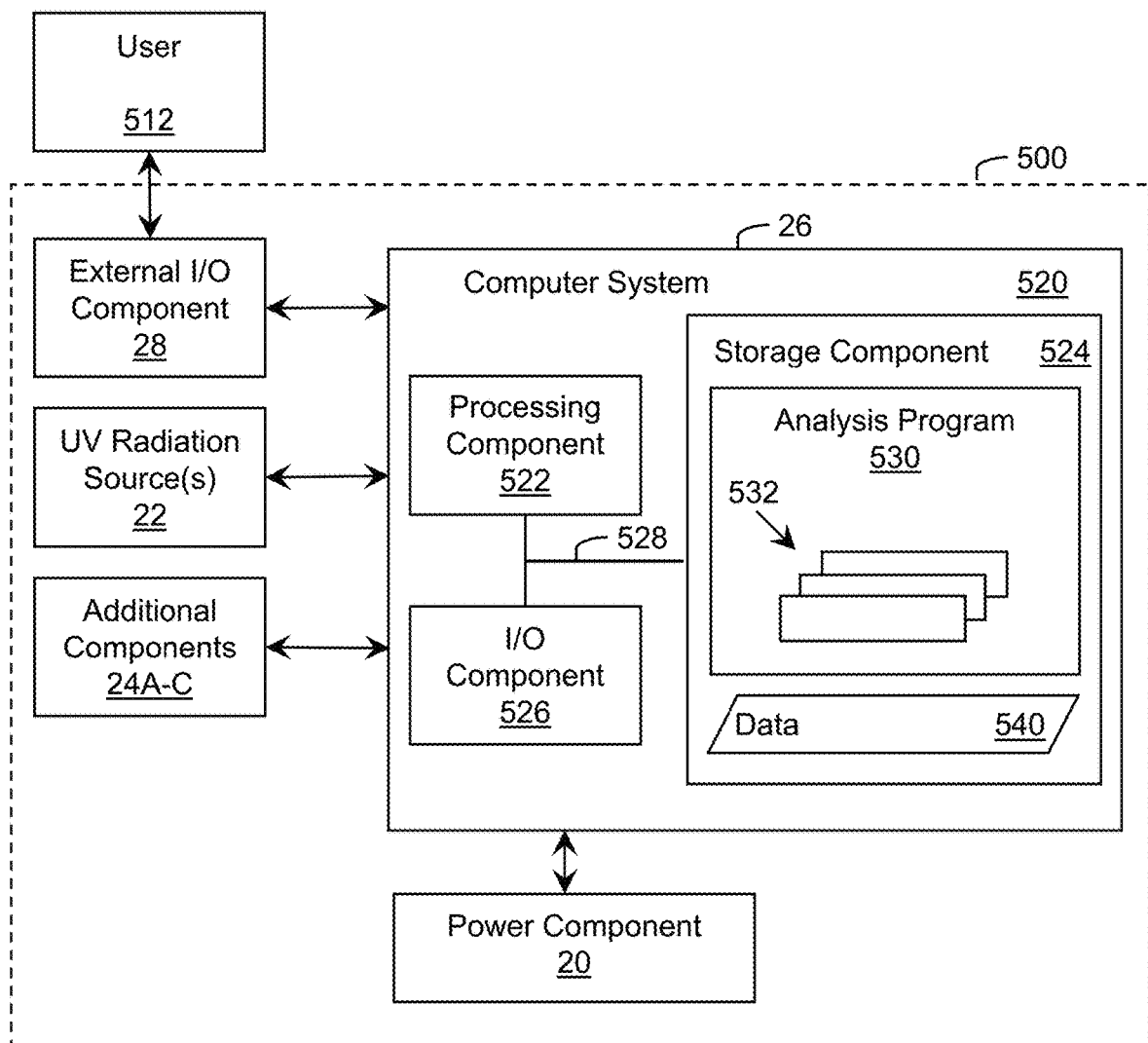
FIG. 5 shows a schematic block diagram representative of an illustrative system for irradiating a fluid flowing through a channel according to an embodiment.

FIG. 5 shows a schematic block diagram representative of an illustrative system 500 for irradiating a fluid flowing through a channel according to an embodiment. In this embodiment, the system 500 is shown including the ultraviolet radiation sources 22 (UV radiation source(s)) and the additional components 24A-C for the purposes of illustrating the interaction of all of the components that are used to provide an ultraviolet treatment of a fluid in the channel of a dispensing unit.

As depicted in FIG. 5 and described herein, the ultraviolet treatment system 500 can include a control system 26. In one embodiment, the control system 26 can be implemented as a computer system 520 including an analysis program 530, which makes the computer system 520 operable to manage the ultraviolet radiation sources 22 and the additional components 24A-C in the manner described herein. In particular, the analysis program 530 can enable the computer system 520 to operate the ultraviolet radiation sources 22 to generate and direct ultraviolet radiation towards the fluid and process data corresponding to one or more attributes regarding the fluid, which can be acquired by the additional components 24A-C. The computer system 520 can individually control each ultraviolet radiation source 22 and the additional components 24A-C and/or control two or more of the ultraviolet radiation sources and the additional components 24A-C as a group. Furthermore, the ultraviolet radiation sources 22 can emit ultraviolet radiation of substantially the same wavelength or of multiple distinct wavelengths, or at any other selected sets of peak wavelengths.

In an embodiment, during an initial period of operation, the computer system 520 can acquire data from at least one of the additional components 24A-C regarding one or more attributes of the fluid and generate data 540 for further processing. The data 540 can include information regarding a presence of biological activity (e.g., microorganisms, viruses, bacteria, and/or the like) in the fluid, an amount of radiation (e.g., ultraviolet, infrared, visible, and/or microwave) detected, and/or the like. The computer system 520 can use the data 540 to control one or more aspects of the ultraviolet radiation generated by the ultraviolet radiation source(s) 22 during an ultraviolet treatment of the fluid and/or interior of the channel.

Furthermore, one or more aspects of the operation of the ultraviolet radiation sources 22 can be controlled or adjusted by a user 512 via an external interface I/O component 28 (e.g. user input component 28 in FIG. 1A). The external interface I/O component 28 can be located, for example, on the exterior of the dispensing unit or remotely from the dispensing unit and used to allow the user 512 to selectively turn on/off the ultraviolet radiation sources 22.

The external interface I/O component 28 can include, for example, a touch screen that can selectively display user interface controls, such as control dials, which can enable the user 512 to adjust one or more of: an intensity, scheduling, and/or other operational properties of the set of ultraviolet radiation sources 22 (e.g., operating parameters, radiation characteristics). In an embodiment, the external interface I/O component 28 could conceivably include a keyboard, a plurality of buttons, a joystick-like control mechanism, and/or the like, which can enable the user 512 to control one or more aspects of the operation of the set of ultraviolet radiation sources 22. The external interface I/O component 28 also can include any combination of various output devices (e.g., an LED, a visual display), which can be operated by the computer system 520 to provide status information pertaining to a treatment of a fluid for use by the user 512. For example, the external interface I/O component 28 can include one or more LEDs for emitting a visual light for the user 512, e.g., to indicate a status of the ultraviolet treatment of the fluid. In an embodiment, the external interface I/O component 28 can include a speaker for providing an alarm (e.g., an auditory signal), e.g., for signaling that ultraviolet radiation is being generated or that an ultraviolet treatment has finished.

The computer system 520 is shown including a processing component 522 (e.g., one or more processors), a storage component 524 (e.g., a storage hierarchy), an input/output (I/O) component 526 (e.g., one or more I/O interfaces and/or devices), and a communications pathway 528. In general, the processing component 522 executes program code, such as the analysis program 530, which is at least partially fixed in the storage component 524. While executing program code, the processing component 522 can process data, which can result in reading and/or writing transformed data from/to the storage component 524 and/or the I/O component 526 for further processing.

The pathway 528 provides a communications link between each of the components in the computer system 520. The I/O component 526 and/or the external interface I/O component 526 can comprise one or more human I/O devices, which enable a human user 512 to interact with the computer system 520 and/or one or more communications devices to enable a system user 512 to communicate with the computer system 520 using any type of communications link. To this extent, during execution by the computer system 520, the analysis program 530 can manage a set of interfaces (e.g., graphical user interface(s), application program interface, and/or the like) that enable human and/or system users 512 to interact with the analysis program 530. Furthermore, the analysis program 530 can manage (e.g., store, retrieve, create, manipulate, organize, present, etc.) the data, such as data 540, using any solution.

In any event, the computer system 520 can comprise one or more general purpose computing articles of manufacture (e.g., computing devices) capable of executing program code, such as the analysis program 530, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the analysis program 530 can be embodied as any combination of system software and/or application software.

Furthermore, the analysis program 530 can be implemented using a set of modules 832. In this case, a module 532 can enable the computer system 520 to perform a set of tasks used by the analysis program 530, and can be separately developed and/or implemented apart from other portions of the analysis program 530. When the computer system 520 comprises multiple computing devices, each computing device can have only a portion of the analysis program 530 fixed thereon (e.g., one or more modules 532). However, it is understood that the computer system 520 and the analysis program 530 are only representative of various possible equivalent monitoring and/or control systems that may perform a process described herein with regard to the control unit, the ultraviolet radiation sources and the sensors. To this extent, in other embodiments, the functionality provided by the computer system 520 and the analysis program 530 can be at least partially be implemented by one or more computing devices that include any combination of general and/or specific purpose hardware with or without program code. In each embodiment, the hardware and program code, if included, can be created using standard engineering and programming techniques, respectively. In another embodiment, the control unit can be implemented without any computing device, e.g., using a closed loop circuit implementing a feedback control loop in which the outputs of one or more sensors are used as inputs to control the operation of a treatment. Illustrative aspects of the invention are further described in conjunction with the computer system 520. However, it is understood that the functionality described in conjunction therewith can be implemented by any type of monitoring and/or control system.

When the computer system 520 comprises multiple computing devices, each computing device can have only a portion of the analysis program 530 fixed thereon (e.g., one or more modules 532). However, it is understood that the computer system 520 and the analysis program 530 are only representative of various possible equivalent computer systems that may perform a process described herein. To this extent, in other embodiments, the functionality provided by the computer system 520 and the analysis program 530 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 520 includes multiple computing devices, the computing devices can communicate over any type of communications link. Furthermore, while performing a process described herein, the computer system 520 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

All of the components depicted in FIG. 5 can receive power from a power component 20, as discussed herein. The power component 20 can take the form of one or more batteries, a vibration power generator that can generate power based on magnetic induced oscillations or stresses developed on a piezoelectric crystal, a wall plug for accessing electrical power supplied from a grid, and/or the like. In an embodiment, the power source can include a super capacitor that is rechargeable. Other power components that are suitable for use as the power component can include solar, a mechanical energy to electrical energy converter such as a piezoelectric crystal, a rechargeable device, etc.

While shown and described herein as a system and method, it is understood that aspects of the present invention further provide various alternative embodiments. For example, in one embodiment, the various embodiments of the present invention can include a computer program fixed in at least one computer-readable medium, which when executed, enables a computer system to facilitate the ultraviolet irradiation of fluids. To this extent, the computer-readable medium includes program code, such as the analysis program 530, which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the present invention can provide a method of providing a copy of program code, such as the analysis program 530, which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the present invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the various embodiments of the present invention can implement a method that facilitates the ultraviolet irradiation of fluids. This can include configuring a computer system, such as the computer system 520, to implement a method for facilitating the ultraviolet irradiation of fluids. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system, comprising:
  a first channel for fluid to flow there through;
  a valve located adjacent to the first channel for controlling a flow rate of the fluid flowing through the first channel, wherein controlling the flow rate includes allowing the fluid to flow, varying a rate of flowing fluid, and stopping the fluid from flowing;
  a set of ultraviolet radiation sources configured to irradiate an interior of the first channel and the flowing fluid within the first channel or the interior of the first channel without the flowing fluid with ultraviolet radiation, the set of ultraviolet radiation sources configured to operate in a UV-C wavelength range;
  a light guide configured to uniformly distribute the ultraviolet radiation, wherein the light guide includes a reflective region;

a second channel separate from the first channel, wherein the flowing fluid flows through the second channel when the fluid does not need to be irradiated with ultraviolet radiation;

a power supply connected to the set of ultraviolet radiation sources;

a filter fluidly connected to the first channel, the filter configured to filter the fluid prior to irradiation, wherein the set of ultraviolet radiation sources are not located in the filter;

a control system including a set of processors configured to control and adjust the flow rate of the fluid flowing through the first channel using the valve and the ultraviolet radiation generated by the set of ultraviolet radiation sources based on a set of current conditions, wherein the set of current conditions affect disinfection of the flowing fluid when the fluid is flowing or affect disinfection of the interior of the first channel when the fluid is not flowing; and a user input component configured to receive a user input for the control system to adjust the ultraviolet radiation generated by the set of ultraviolet radiation sources.

2. The system of claim 1, further comprising an external interface component configured to provide an alarm for signaling ultraviolet radiation is being generated or an ultraviolet treatment has finished.

3. The system of claim 1, wherein the interior of the first channel comprises an ultraviolet reflective material.

4. The system of claim 1, wherein the light guide comprises a layer including a plurality of regions formed of an ultraviolet transparent material, wherein at least one region in the plurality of regions is a protrusion structure.

5. The system of claim 1, further comprising a set of sensors configured to detect the set of current conditions, wherein the set of current conditions includes at least one of: the flow rate of the fluid or a transparency of the fluid.

6. The system of claim 1, further comprising a set of mixing elements located within the first channel, the set of mixing elements configured to modify a flow velocity of the fluid, wherein the set of mixing elements includes a set of reflective and diffusive properties to uniformly distribute the ultraviolet radiation within the fluid.

7. The system of claim 1, wherein the first channel includes a set of flow control elements configured to uniformly distribute the ultraviolet radiation throughout the fluid.

8. A water dispensing unit, comprising:
a first channel for fluid to flow there through;
a valve located adjacent to the first channel for controlling a flow rate of fluid flowing through the first channel, wherein controlling the flow rate includes allowing the fluid to flow, varying a rate of flowing fluid, and stopping the fluid from flowing;
a set of ultraviolet radiation sources configured to irradiate an interior of the first channel and the flowing fluid within the first channel or the interior of the first channel without the flowing fluid with ultraviolet radiation, the set of ultraviolet radiation sources configured to operate in a UV-C wavelength range;
a light guide configured to uniformly distribute the ultraviolet radiation, wherein the light guide includes a reflective region;
a second channel separate from the first channel, wherein the flowing fluid flows through the second channel when the fluid does not need to be irradiated with ultraviolet radiation;
a power supply connected to the set of ultraviolet radiation sources;
a filter fluidly connected to the first channel, the filter configured to filter the fluid prior to irradiation, wherein the set of ultraviolet radiation sources are not located in the filter;
a control system including a set of processors configured to control and adjust the flow rate of the fluid flowing through the first channel using the valve and the ultraviolet radiation generated by the set of ultraviolet radiation sources based on a set of current conditions, wherein the set of current conditions affect disinfection of the flowing fluid when the fluid is flowing or affect disinfection of the interior of the first channel when the fluid is not flowing; and
a user input component configured to receive a user input for the control system to adjust the ultraviolet radiation generated by the set of ultraviolet radiation sources.

9. The water dispensing unit of claim 8, further comprising an external interface component configured to provide an alarm for signaling ultraviolet radiation is being generated or an ultraviolet treatment has finished.

10. The water dispensing unit of claim 8, wherein the interior of the first channel comprises an ultraviolet reflective material.

11. The water dispensing unit of claim 8, wherein the light guide comprises a layer including a plurality of regions formed of an ultraviolet transparent material, wherein at least one region in the plurality of regions is a protrusion structure.

12. The water dispensing unit of claim 8, further comprising a set of sensors configured to detect the set of current conditions, wherein the set of current conditions includes at least one of: the flow rate of the fluid or a transparency of the fluid.

13. The water dispensing unit of claim 8, further comprising a set of mixing elements located within the first channel, the set of mixing elements configured to modify a flow velocity of the fluid, wherein the set of mixing elements includes a set of reflective and diffusive properties to uniformly distribute the ultraviolet radiation within the fluid.

14. The water dispensing unit of claim 8, wherein the first channel includes a set of flow control elements configured to uniformly distribute the ultraviolet radiation throughout the fluid.

15. A liquid dispensing unit, comprising:
a channel for fluid to flow there through;
a valve located adjacent to the channel for controlling a flow rate of the fluid flowing through the channel, wherein controlling the flow rate includes allowing the fluid to flow, varying a rate of flowing fluid, and stopping the fluid from flowing;
a set of ultraviolet radiation sources configured to irradiate an interior of the channel and the flowing fluid within the channel or the interior of the channel without the flowing fluid with ultraviolet radiation, the set of ultraviolet radiation sources configured to operate in a UV-C wavelength range;
a light guide configured to uniformly distribute the ultraviolet radiation, wherein the light guide comprises a layer including a plurality of regions formed of an ultraviolet transparent material, wherein at least one region in the plurality of regions is a protrusion structure;
a power supply connected to the set of ultraviolet radiation sources;

a filter fluidly connected to the channel, the filter configured to filter the fluid prior to irradiation, wherein the set of ultraviolet radiation sources are not located in the filter;

a control system including a set of processors configured to control and adjust the flow rate of the fluid flowing through the channel using the valve and the ultraviolet radiation generated by the set of ultraviolet radiation sources based on a set of current conditions, wherein the set of current conditions affect disinfection of the flowing fluid when the fluid is flowing or affect disinfection of the interior of the first channel when the fluid is not flowing; and a user input component configured to receive a user input for the control system to adjust the ultraviolet radiation generated by the set of ultraviolet radiation sources.

16. The liquid dispensing unit of claim 15, further comprising an external interface component configured to provide an alarm for signaling ultraviolet radiation is being generated or an ultraviolet treatment has finished.

17. The liquid dispensing unit of claim 15, wherein the interior of the channel comprises an ultraviolet reflective material.

18. The liquid dispensing unit of claim 15, further comprising a second channel separate from the channel, wherein the set of ultraviolet radiation sources are located within the channel and are not located within the second channel.

19. The liquid dispensing unit of claim 15, further comprising a set of sensors configured to detect the set of current conditions, wherein the set of current conditions includes at least one of: the flow rate of the fluid or a transparency of the fluid.

20. The liquid dispensing unit of claim 15, wherein the channel includes a set of flow control elements configured to uniformly distribute the ultraviolet radiation throughout the fluid.

* * * * *